United States Patent [19]

Hosaka

[11] Patent Number: 4,769,298
[45] Date of Patent: Sep. 6, 1988

[54] LAMINATED FUEL CELL

[75] Inventor: Minoru Hosaka, Tokyo, Japan

[73] Assignee: Ishikawajima-Harima Jukogyo Kabushiki Kaisha, Tokyo, Japan

[21] Appl. No.: 46,469

[22] Filed: May 6, 1987

[30] Foreign Application Priority Data

May 12, 1986 [JP] Japan .................................. 61-107896

[51] Int. Cl.⁴ .......................... H01M 8/04; H01M 2/00
[52] U.S. Cl. ....................................... 429/34; 429/26; 429/120
[58] Field of Search ............................ 429/34, 26, 120

[56] References Cited

U.S. PATENT DOCUMENTS 4,342,816 8/1982 Kothmann et al. ................... 429/13
4,444,851 4/1984 Maru ................................. 429/34 X
4,578,324 3/1986 Koehler et al. ..................... 429/34 X
4,659,635 4/1987 Reiser et al. ....................... 429/46 X Primary Examiner—Brian E. Hearn
Assistant Examiner—Stephen J. Kalafut

[57] ABSTRACT

A laminated fuel cell which can generate high output power in a simple manner, can be fabricated in a simple manner, can facilitate the transportation and can improve the efficiency of installation space.

6 Claims, 3 Drawing Sheets

LAMINATED FUEL CELL

BACKGROUND OF THE INVENTION

The present invention relates to a laminated fuel cell used for directly transforming chemical energy into electric energy and more particularly a laminated fuel cell capable of generating high output power.

In conventional inner manifold type laminated fuel cells as shown in FIG. 1, both surfaces of an electrolytic plate or tile a are made into intimate contact with an oxygen electrode b and a fuel electrode c and an oxidized gas (OG) is supplied to the side of the oxygen electrode b while a fuel gas (FG) is supplied to the side of the fuel electrode c, whereby one cell element is provided. A plurality of such cell elements are laminated through separators d and oxidized gas supply and dischage holes and fuel gas supply and discharge holes are formed through the peripheral portions of the electrolytic plates a and separators d. Ridges and valleys e are defined on both of the major surfaces of each separator d to form gas passages through which the gases flow. The cell elements thus laminated are clamped by a pair of upper and lower holders and clamping or locking bolts are tightened so that the separator d in each layer forces the electrodes b and c to be uniformly pressed against the electrolyric plate a, whereby a fuel cell stack S is provided. The stack S is disposed within a vertical vessel f which maintains a predetermined temperature (for instance, about 650° C.) and a predetermined pressure.

In conventional external manifold type laminated fuel cells, a plurality of cell elements are laminated in the manner described above with reference to FIG. 1 and are surrounded by a manifold h having an oxidized gas supply pipe g and a discharge pipe (not shown) and a manifold j having a fuel gas supply pipe i and a discharge pipe (not shown) as shown in FIG. 3.

In the conventional laminated fuel cells of the types described above, the plate a, electrodes b and c and separator d in each cell element are made each in the form of a square or substantially square plate having a relatively small surface area from the viewpoint of the fabrication, temperature distributions of the oxidized and fuel gases and pressure loss. Because, in the case where oxidized and fuel gases flow in crossed manner, a square or substantially square cell element is suitable for attaining less pressure loss and better temperature distribution; the square configuration is advantageous in easiness of uniformly tightening the cell elements. Also in the case where the oxidized and fuel gases flow in one direction or opposite directions in parallel with each other, the square or substantially square cell element has been adopted.

In order to increase the output power of a laminated fuel cell, the whole area of the cell must be increased since the output power of each cell element per unit area has some upper limit. Increase of the whole area of the cell may be effected by increasing the area of each cell element or increasing the number of the laminated cell elements.

However, in the conventional fuel cells using square or substantially square cell elements, one cell element is 1.2 m×1.2 m at most from the viewpoint of pressure loss in the directions of gas flows as well as undesired increase in temperature due to generated heat of the cell and therefore the output power generated is of the order of 2 KW at most. Therefore, in order to obtain high output power, a great number of cell elements must be laminated. But, the lamination of a great number of cell elements will cause uneven conditions between the upper and lower cell elements since the lower cell elements are burdened by the upper cell elements themselves. Thus, the number of limited cell elements per cell stack is limited to be of the order of 300 to 600 layers.

The lamination of cell elements is limitative also from the viewpoint of fabrication and transportation and the upper limit of the output power available per laminated fuel cell stack is 1000 KW at most.

A large-scale power generating plant may be constructed by connecting a large number of laminated fuel cell stacks with each other. The smaller the output power of each stack is, the more the number of modules in the plant is increased so that the number of pipe lines is increased and the operation of the plant becomes much troublesome.

In view of the above, the primary object of the present invention is to provide a laminated fuel cell which can attain high output power without degrading the performance and reliability, which can be fabricated and transported advantageously and which can overcome the problem of the difficult plant operation due to the increased number of pipe lines.

The above and other objects, effects and features of the present invention will become more apparent from the following description of a preferred embodiment thereof taken in conjunction with the accompanying drawings.

DETAILED DESCRIPTION OF THE PREFERRED EMBODIMENT

Figure 1:
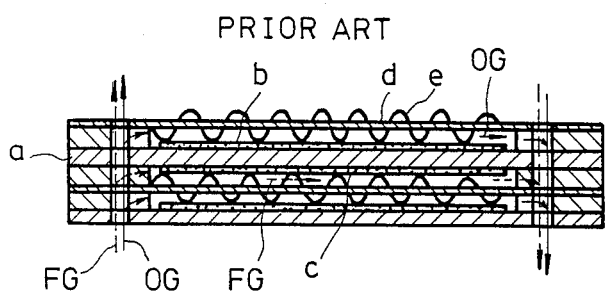
FIG. 1 is a sectional view of a conventional laminated fuel cell.
Figure 2:
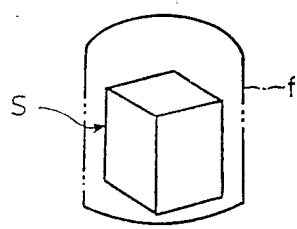
FIG. 2 shows a conventional laminated fuel cell housed in a vertical vessel.
Figure 3:
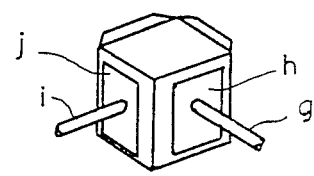
FIG. 3 is a perspective view of a conventional external manifold type laminated fuel cell.
Figure 4:
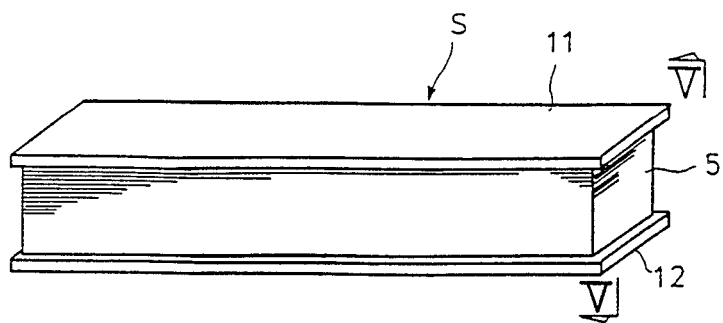
FIG. 4 is a perspective view of a laminated fuel cell in accordance with the present invention.
Figure 5:
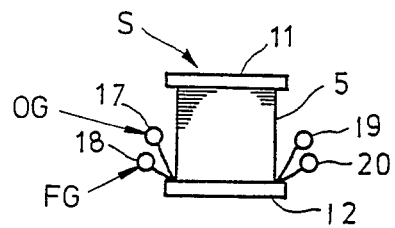
FIG. 5 is an end view thereof looking in the direction indicated by the arrows V of FIG. 4.
Figure 6:
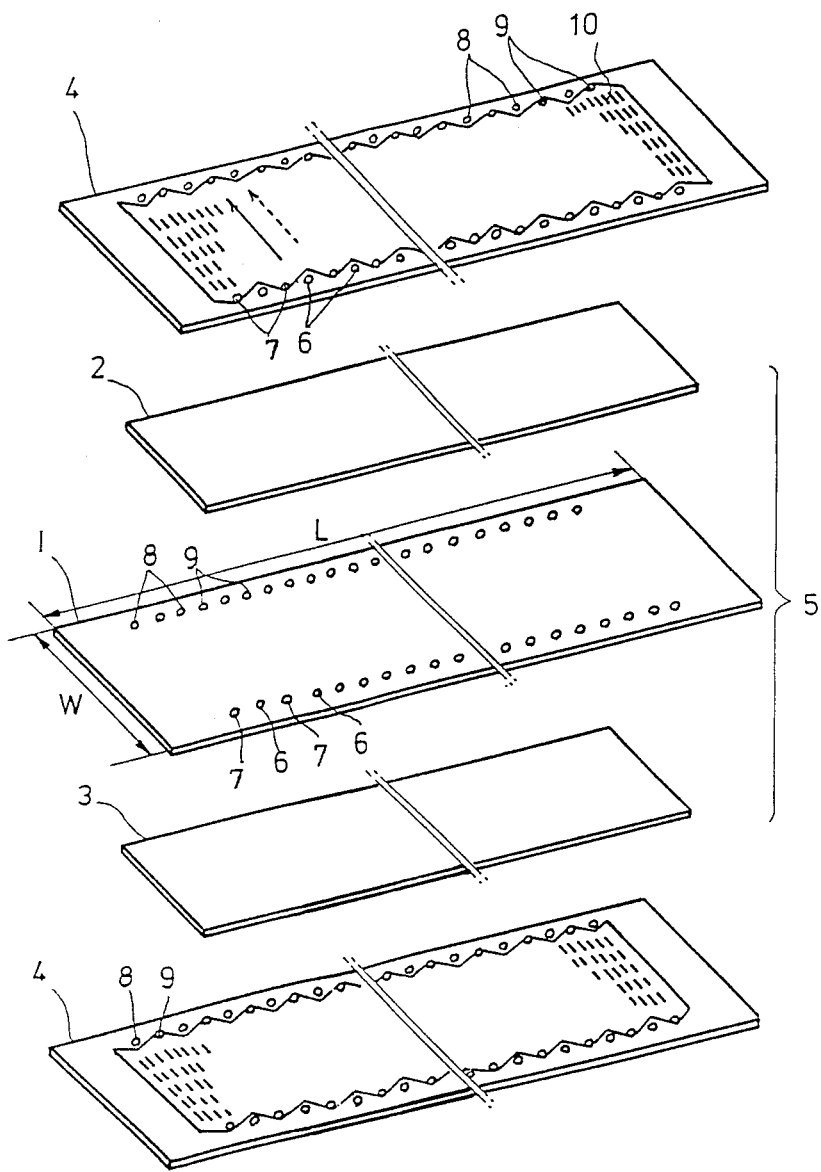
FIG. 6 is an exploded perspective view of one cell element of the laminated fuel cell in accordance with the present invention.

As shown in FIGS. 4, 5 and 6, a thin plate type electrolytic plate 1, a thin plate type oxygen electrode 2, a thin plate type fuel electrode 3 and a thin plate type separator 4 each of which is in the form of a rectangle and has one side substantially two or more times as long as the other side (perpendicular to said one side) are laminated one upon another, whereby an elongated stack S is constructed. More specfically, the length L of the electrolytic plate 1 is greater than its width W and is so selected that the laminated fuel cell stack S as well as its vessel can be loaded into an internationally standardized container with the length L=12 m. Oxidized gas and fuel gas supply holes 6 and 7 are alternately formed through the electrolytic plate 1 along one longitudinal side thereof while oxidized gas and fuel gas discharge holes 8 and 9 are formed through the electrolytic plate 1 along the other longitudinal side thereof so that the oxidized gas OG and the fuel gas FG to be supplied respectively to the oxygen and fuel electrodes 2 and 3 which are respectively in contact with the upper and lower surfaces of the electrolytic plate 1 are caused to flow in one direction or opposite directions in parallel with each other. The separators 4 which separates the adjacent cell elements each comprising the electrolytic plate 1, the oxygen electrode 2 and the fuel electrode 3 assembled in the manner described above when a plurality of such cell elements are laminated or stacked, is same with the electrolytic plate 1 in size. Oxidized gas and fuel gas supply holes 6 and 7 are formed through each separator 4 along one longitudinal side thereof such that they are aligned with the corresponding holes 6 and 7 on the electrolytic plate 1 while oxidized gas and fuel gas discharge holes 8 and 9 are formed through each separator 4 along the other longitudinal side thereof such that they are aligned with the corresponding discharge holes 8 and 9 on the electrolytic plate 1. Furthermore, gas passages 10 each intercommunicating the opposing fuel gas supply and discharge holes 7 and 9 are defined in one major surface of each separator 4 while gas passages (not shown) each intercommunicating the opposing oxidized gas supply and discharge holes 6 and 8 are defined in the other major surface of each separator 4, so that both of the oxidized gas and fuel gas are caused to flow in the widthwise direction of the separators 4 between them.

Figure 7:
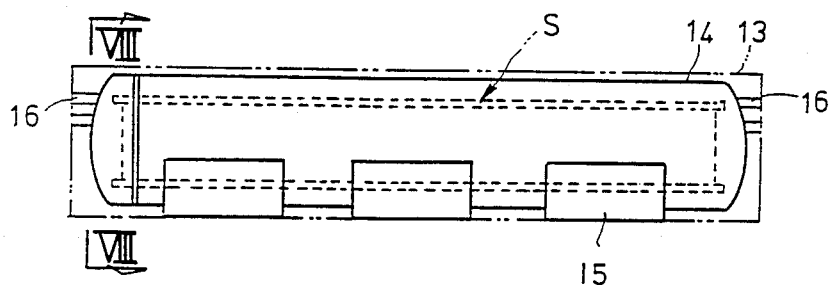
FIG. 7 is a side view illustrating a laminated fuel cell in accordance with the present invention disposed horizontally in a horizontal vessel.
Figure 8:
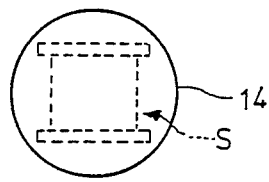
FIG. 8 is an end view thereof looking in the direction indicated by the arrows VIII of FIG. 7.

According to the present invention, a plurality of elongated large cell elements 5 each comprising the electrolytic plate 1, the oxygen electrode 2 and the fuel electrode 3 are laminated one upon another and separated from the adjacent cell elements 5 through the separators 4 and the lamination thus formed is tightly clamped between upper and lower holders 11 and 12 as best shown in FIG. 5 into an elongated and large stack S. And then, as shown in FIGS. 7 and 8, the stack is housed in a vessel 14 circular in cross section and which can be loaded into an internationally standardized container 13 with the length of 12 m without leaving any unuseful space. In this case, in view of pressure loss, temperature distribution and allowable vessel size for accomodation in a container, the width W of the stack S is set to a maximum value (for instance, about 1.2 m); the height thereof is set to about 1 m for the reason mentioned below; and the length L thereof is so selected (for instance, about 10 m) that the stack S can be loaded into the vessel 14 without leaving an unuseful space.

The setting of the stack height to about 1 m is owing to the fact that the number of laminated cell elements is limited to 300 layers or so from the viewpoint of reliability since more than 300 layers might cause the situation that the lower cell elements are burdened by the upper cell elements themselves. According to the present invention, high output power is obtained by setting the length L to substantially large value.

Reference numeral 15 indicates legs for supporting the vessel 14 in the container 13; 16, holding members for preventing the rocking of the vessel 14 during transportation; 17, an oxidized gas supply pipe; 18, a fuel gas supply pipe; 19, an oxidized gas discharge pipe; and 20, a fuel gas discharge pipe.

When the oxidized gas OG and the fuel gas FG are respectively supplied through the supply pipes 17 and 18 on one side of the stack S, they flow, through the respective supply holes 6 and 7 formed along the length of the elongated and large stack S, in the widthwise direction; i.e., in the direction of a shorter side of the oxygen and fuel electrodes 2 and 3 in each cell element which is separated from the adjacent cell elements by the separators 4. Since all the gases OG and FG are forced flow in the widthwise or shorter-side direction over the length of the elongated and large stack S, the pressure loss and the temperature distribution are substantially similar to those in a conventional cell element in the form of square W×W.

As mentioned above, the size in the gas flow direction of cell elements, i.e., the width W of cell elements affects pressure loss and temperature distribution; and the height of lamination affects the tightening pressure for the cell elements.

Thus, according to the present invention, the width W and number of lamination of the cell elements which will govern the performance and service life of a laminated cell are specified to optimum values and the adjustment of output power is carried out by selecting the length L.

With the embodiment described in the above and having W=1.2 m, stack height=1.0 m and L=10 m, the output power up to 4000 KW per stack can be obtained.

Characteristics of the laminated fuel cell according to the present invention will be described in comparison with a case where a plurality of conventional square stacks are arrayed in the vessel 14.

(A) Theoretically, a fuel cell generates an output power in proportion to cell area; however, in practice, the output power may be locally deteriorated especially at peripheries of the cell which are lowered in temperature due to radiation of heat, resulting in lowering of the output efficiency as a whole.

While the conventional laminated fuel cells are of square or substantially square type, the fuel cell according to the present invention is of elongated type whose longer side is substantially two or more times as long as the shorter side and functions as if an array of the conventional cells were seamlessly connected with each other, thereby drastically reducing the peripheral or lower-temperature portions of the cell. As a result, the laminated fuel cell according to the present invention can operate at better efficiency and in more stable manner than an array of conventional square or substantially square stacks.

(B) When a plurality of conventional square stacks are arranged in a vessel, a dead space is left between the adjacent stacks. Especially in the case where the oxidized and fuel gases flow in crossed manner, such dead space is further increased because of the installation of the gas supply and discharge pipes. On the other hand, according to the present invention, such dead space can be reduced to a minimum so that the volume efficiency can be improved and consequently the stack can be made large in size.

(C) With the present invention, the width of the stack is set to constant and the length thereof is varied to adjust the output power, which fact will facilitate standardization of materials used as well as standardization and automation of production facilities. As a result, stacks may be produced at lower costs and with high reliability.

With the conventional array of square stacks, number of connections such as pipe lines, wirings and valves is increased, resulting in increase of fabrication costs and of factors for failure. By contrast, the laminated fuel cell according to the present invention has less component parts for plant so that reduction in fabrication costs and in failure rate is expected.

So far the present invention has been described in conjunction with the inner manifold type laminated fuel cell, but it is to be understood that the present invention may be equally applied to the outer manifold type and that the length of the stack S may be selected longer or shorter than the length defined in the above-described embodiment.

As described above, according to the present invention, a plurality of cell elements each comprising an electrolytic plate, an oxygen electrode and a fuel electrode which are made into contact with the upper and lower major surfaces, respectively, of the electrolytic plate and in each of which an oxidized gas is supplied to the oxygen electrode while a fuel gas is supplied to the fuel electrode are laminated or stacked through elongated and large separators whose longer side is substantially two or more times as long as the shorter side into a unitary block or stack which in turn is disposed horizontally in a horizontally elongated vessel. In addition, the oxidized gas and the fuel gas are caused to flow in the direction of the shorter side. Thus, the present invention can attain the following excellent effects:

(i) Since the stack is elongated and is large in size, high output power can be easily obtained from the laminated fuel cell;

(ii) Since the gases are caused to flow in the direction of the shorter side, there is no factor which adversely affects the pressure loss and temperature distribution so that the cell elements can be increased in length. Therefore, the stable operation of the laminated fuel cell can be ensured and high output power can be obtained.

(iii) The elongated and large stack is disposed in a horizontally elongated vessel so that its height is not limited during transportation and furthermore it can be supported in a very stable manner.

(iv) High output power can be derived and unlike the prior art laminated fuel cells, a large number of moduls are not needed so that a pipe line system can be shortened in length and the operation of the laminated fuel cell as plant can be facilitated.

(v) Elongated cells can be adapted to be easily fabricated by the recent techniques for the mass production of various component parts such as the methods for fabricating tape, roll type materials and the like.

(vi) The length of one side is substantially two or more times as long as the length of the other side.

Therefore, as compared with the conventional system in which more than two square stacks are arranged, the performance can be enhanced owing to reducing the low-temperature peripheral portions; the dead space can be reduced to a minimum; the associated devices such as pipe line systems can be made simple in construction; the fabrication can be simplified; the fabrication costs can be decreased; and the failure rate can be reduced.

(vii) As compred with the conventional system in which a large number of square stacks are disposed so as to obtain high output power, according to the present invention, the stack can be elongated and made compact in size so that the transportation and operation efficiency of the stack can be facilitated and furthermore, the stack installation space can be reduced.

What is claimed is:

1. A laminated fuel cell comprising: a plurality of cell elements forming a vertical stack; each cell element comprising: a rectangular electrolytic plate, an oxygen electrode in contact with one surface of said electrolytic plate, a fuel electrode in contact with an opposite surface of said electrolytic plate, separator plates separating adjacent cell elements from each other; said plates and electrodes forming identical rectangles with a first pair of parallel sides of a length at least twice that of a second pair of parallel sides; first passages for an oxidized gas on one side of said oxygen electrode; second passages for a fuel gas on one side of said fuel electrode, said passages extending parallel to the second pair of sides; supply manifold means for supplying oxidized gas and fuel gas to said first and second passages respectively; discharge manifold means for discharging oxidized gas and fuel gas from said first and second passages respectively; and a horizontally extending vessel in which said stack is arranged.

2. A fuel cell according to claim 1, wherein the ratio of lengths of said first to said second sides is about 8:1.

3. A fuel according to claim 1, wherein said supply manifold means supply said oxidized gas and said fuel gas so as to flow in said first and second passages respectively in the same direction parallel to each other.

4. A fuel cell according to claim 1, wherein and supply manifold means supply said oxidized gas and said fuel gas so as to flow in said first and second passages respectively in opposite direction to each other.

5. A fuel cell according to claim 1, wherein said supply and discharge manifold means are arranged inside said fuel cell elements.

6. A fuel cell according to claim 1, wherein said supply and discharge manifold means are arranged outside said fuel elements in said vessel.

* * * * *